United States Patent [19]

Wood, Jr.

[11] Patent Number: 4,890,949
[45] Date of Patent: Jan. 2, 1990

[54] TIE ROD END

[75] Inventor: Ruey E. Wood, Jr., St. Clair Shores, Mich.

[73] Assignee: TRW Inc., Lyndhurst, Ohio

[21] Appl. No.: 178,926

[22] Filed: Apr. 7, 1988

[51] Int. Cl.[4] ............................................. F16C 11/00
[52] U.S. Cl. ....................................... 403/77; 403/140; 403/141
[58] Field of Search .................. 403/77, 141, 140, 135, 403/122, 133

[56] References Cited

U.S. PATENT DOCUMENTS

| | | |
|---|---|---|
| 1,824,810 | 9/1931 | Ford . |
| 1,917,502 | 7/1933 | Crawford et al. . |
| 2,274,420 | 2/1942 | Katcher . |
| 2,292,675 | 8/1942 | Thiry . |
| 2,910,316 | 10/1959 | Dier . |
| 2,979,353 | 1/1961 | Sellers, Jr. . |
| 4,235,558 | 11/1980 | Snyder et al. .................... 403/130 |
| 4,360,284 | 11/1982 | Brandenburg . |
| 4,628,758 | 12/1986 | Yuzuriha et al. ................. 74/498 |
| 4,678,350 | 7/1987 | Statz ................................. 384/208 |
| 4,714,262 | 12/1987 | Wood ............................... 280/95 R |

FOREIGN PATENT DOCUMENTS 343297 2/1931 United Kingdom .................. 403/77

Primary Examiner—Andrew V. Kundrat
Attorney, Agent, or Firm—Tarolli, Sundheim & Covell

[57] ABSTRACT

A tie rod end has a one-piece stamped sheet metal housing for connecting a tie rod and a ball stud. The sheet metal housing includes a tie rod receiving portion with a longitudinally extending chamber for receiving an end portion of a tie rod; a socket portion which encloses a ball stud and an elastomeric bearing therebetween; and a connector section extending between the tie rod receiving portion and the socket portion. The sheet metal housing is made by starting with a single flat piece of sheet metal which is formed, using progressive dies, into its final shape. The sheet metal element has only one seam thereon, which extends throughout the tie rod receiving portion and connector portion and through a part only of the socket portion. The single piece of sheet metal encircles the ball stud and bearing and completely defines an opening through which a shank of the ball stud projects.

23 Claims, 4 Drawing Sheets

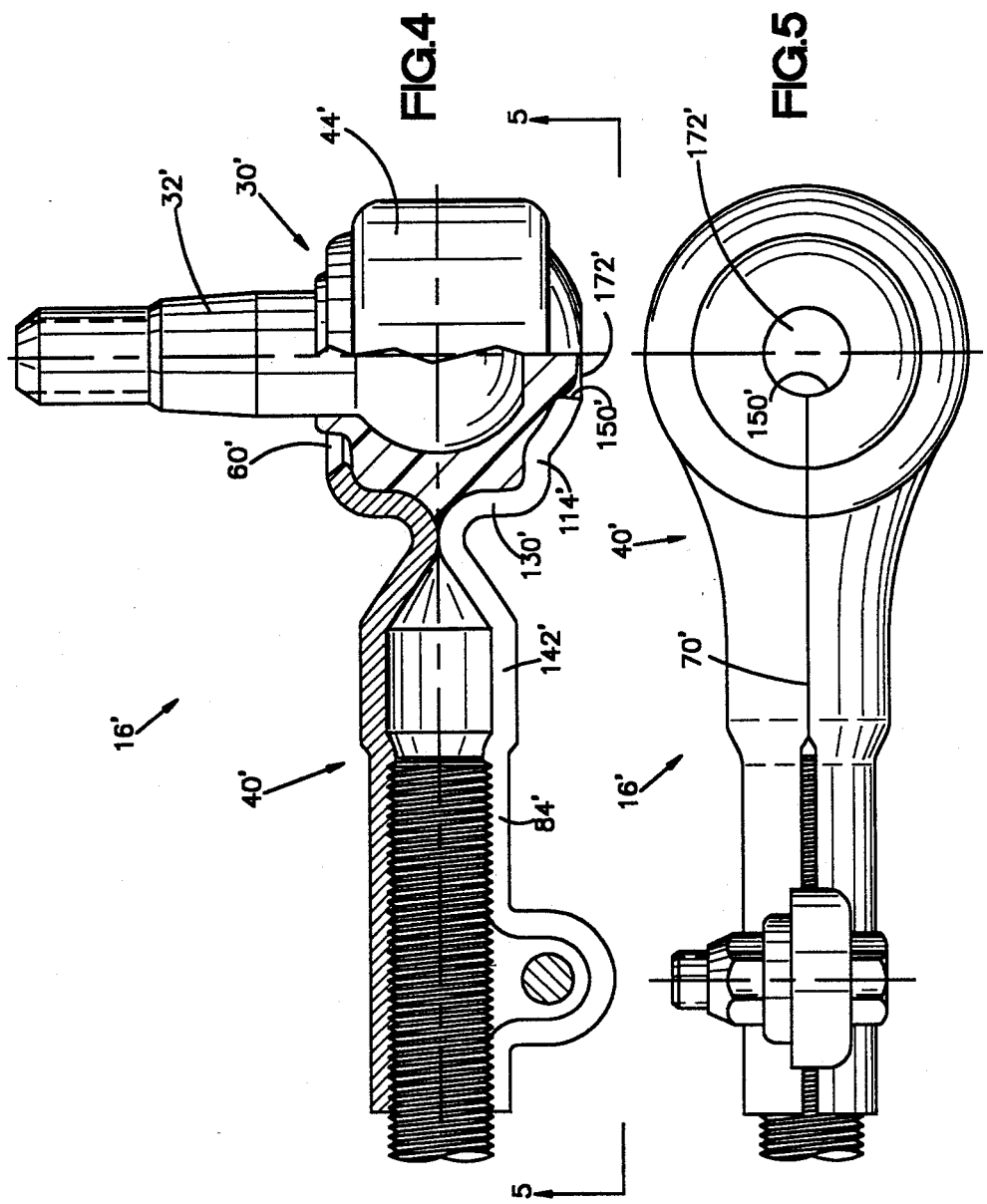

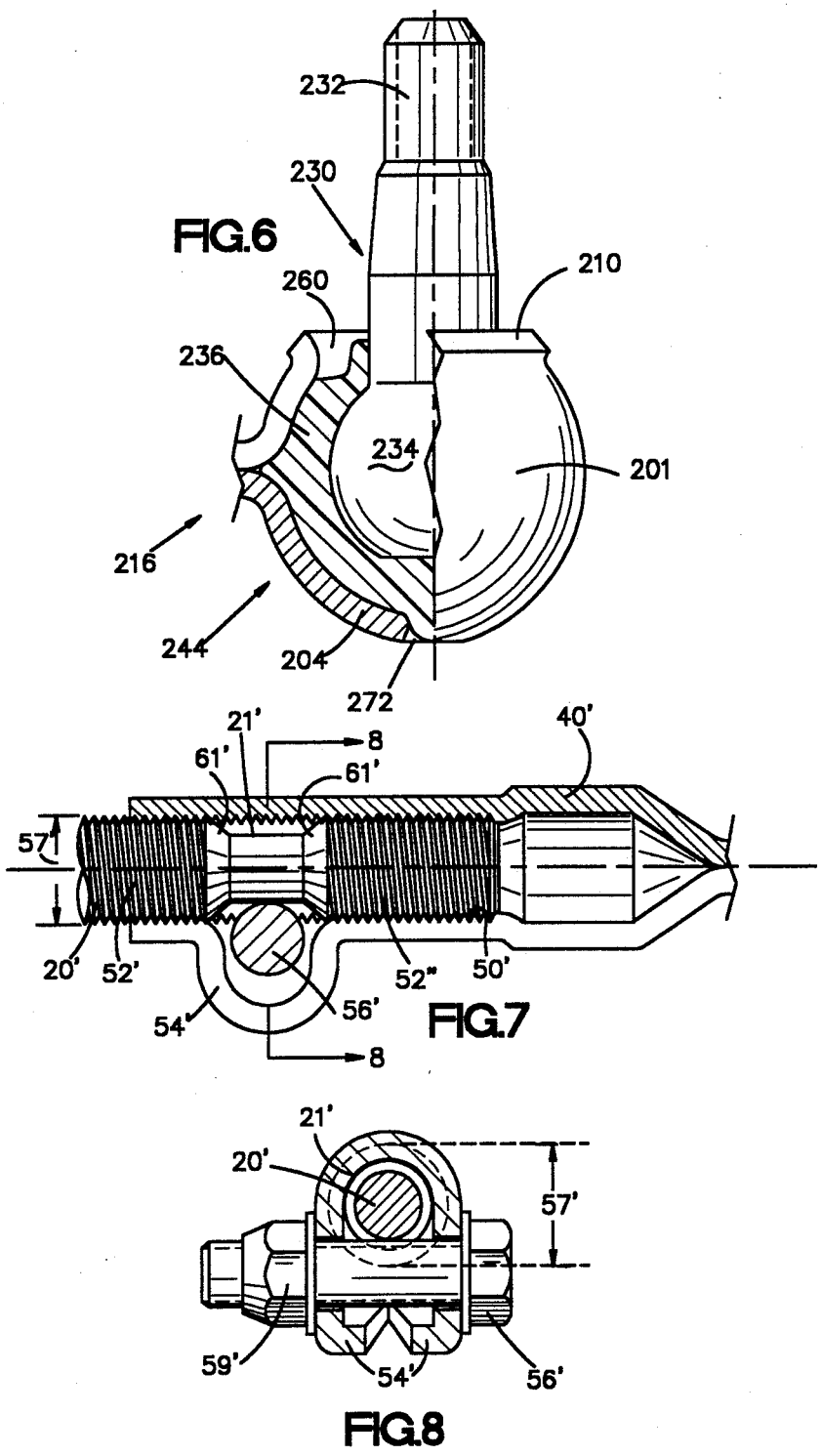

TIE ROD END

BACKGROUND OF THE INVENTION

The present invention relates to a new and improved vehicle steering linkage element. In particular, the present invention relates to a new and improved tie rod end for use in connecting a tie rod with a steerable wheel of a vehicle.

A tie rod end generally includes a housing having (i) a socket portion for receiving a ball stud and (ii) a tie rod receiving portion for receiving a tie rod. The housings of tie rod ends have been forged, cast, or stamped metal elements. U.S. Pat. No. 4,235,558 shows a tie rod end having an elastomeric bearing adhesively bonded to a ball stud. The bearing and ball stud are inserted into a one-piece forged housing. The ball stud extends from an opening in a socket portion of the housing. The material adjacent the opening of the socket portion is deformed to retain the bearing and stud within the socket portion. U.S. Pat. No. 2,910,316 shows a tie rod end having a stamped housing. The housing has an opening which is closed by a separate plate element to define a socket for a ball stud. U.S. Pat. No. 2,274,420 shows a knuckle joint housing having a hollow shank portion. A separate tail piece cooperates with the joint housing to define a socket in which a rubber bearing and a ball stud are disposed.

The use of forgings or castings for the housing of a tie rod end requires heavy manufacturing processes and results in a relatively heavy product. The sheet metal housings for tie rod ends shown in the art, though avoiding these problems, require at least two separate elements to completely define the socket portion of the housing which retains the ball stud.

SUMMARY OF THE INVENTION

The present invention is a new and improved tie rod end having a one-piece sheet metal housing. The sheet metal housing includes a tie rod receiving portion having a longitudinally extending chamber for receiving an end portion of a tie rod; a socket portion which encloses a ball stud and bearing; and a connector portion extending between the tie rod receiving portion and the socket portion.

The socket portion of the one-piece sheet metal housing defines a chamber for receiving the bearing and ball stud. The chamber is at least in part defined by a first surface of the socket portion which encircles the ball stud and engages the bearing. The chamber is also defined by second and third surfaces which engage opposite ends of the bearing and hold the bearing in the chamber. The tie rod receiving portion of the housing defines a chamber for receiving a tie rod therein. The one-piece sheet metal housing has a connecting portion interconnecting the socket portion and the tie rod receiving portion. The socket, tie rod receiving portion and connecting portion comprise one piece of sheet metal having the first, second and third surfaces which encompass the bearing. Thus, the sheet metal housing encircles the ball stud and bearing and completely defines an opening through which a shank of the ball stud projects.

BRIEF DESCRIPTION OF THE DRAWINGS

Further features of the present invention will become apparent to those skilled in the art to which the present invention relates from reading the following specification with reference to the accompanying drawings, in which:

FIG. 3 is an enlarged plan view of the tie rod end of FIG. 2;

FIG. 4 is an enlarged view, partly in section, illustrating another embodiment of a tie rod end of the present invention;

FIG. 5 is an enlarged plan view of the tie rod end of FIG. 4;

FIG. 6 is an enlarged view, partly in section, illustrating a tie rod end which is still another embodiment of the present invention;

FIG. 7 is a sectional view of a portion of yet another embodiment of the present invention; and FIG. 8 is a view taken along the lines 8—8 of FIG. 7.

DESCRIPTION OF PREFERRED EMBODIMENTS

Figure 1:
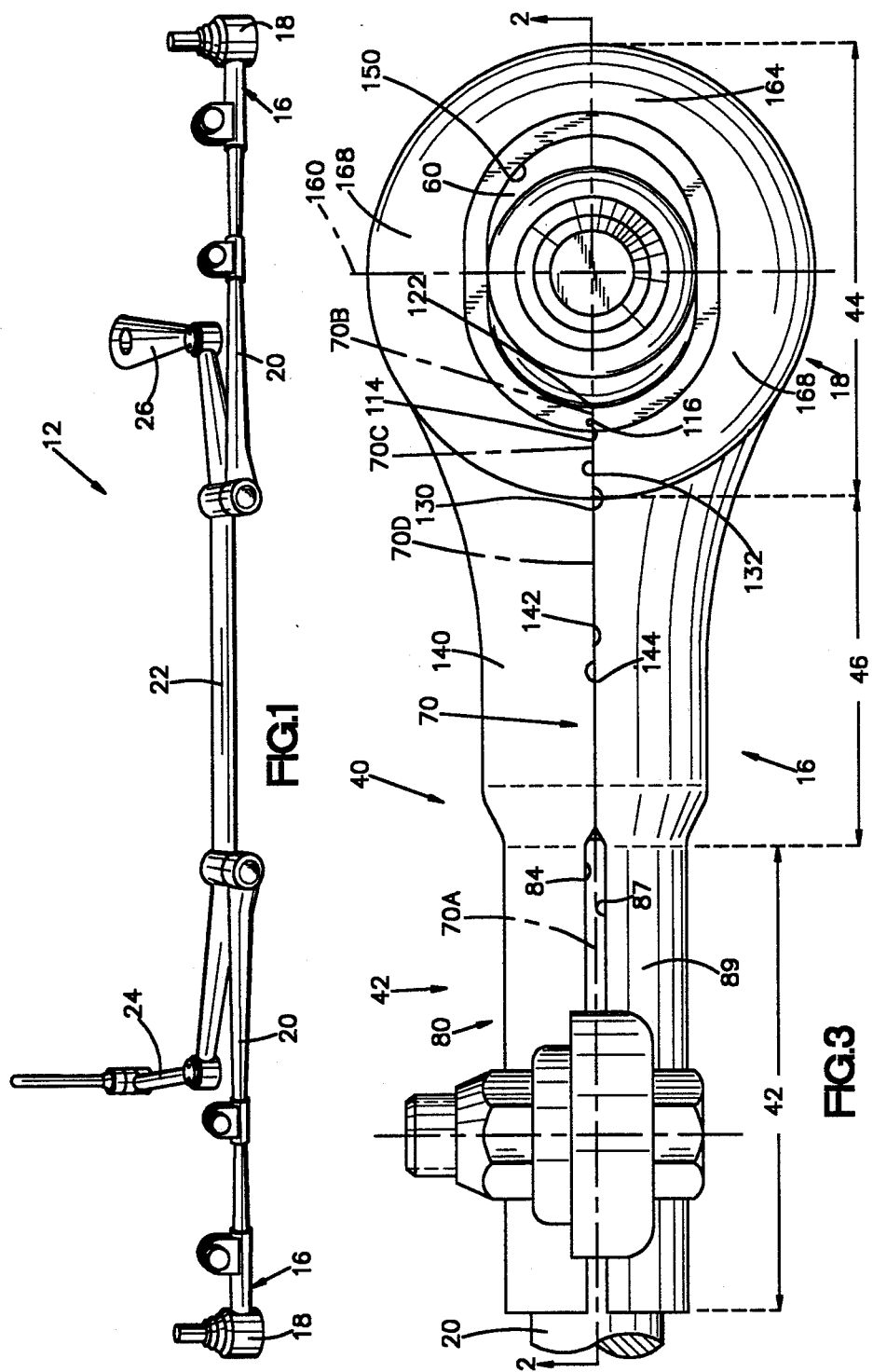
FIG. 1 is a schematic perspective view of a linkage used in a vehicle steering mechanism and having a pair of tie rod ends constructed in accordance with the present invention.

The present invention is a tie rod end and may be embodied in various constructions. A tie rod end embodying the present invention may be used in a variety of applications. The present invention is shown in FIG. 1 as embodied in a portion of a vehicle steering linkage 12. The linkage 12 is used to turn the steerable wheels of the vehicle. The linkage 12 includes a pair of tie rod ends 16 constructed in accordance with the present invention.

Each tie rod end 16 includes a ball and socket assembly 18 which is adapted to be connected to a front wheel spindle (not shown) of the vehicle. Each tie rod end 16 is connected to a tie rod 20 which is pivotally connected to an intermediate portion of a center link 22. The center link 22 is connected at one end to an idler arm 24 which is pivotally mounted on the vehicle frame (not shown). The opposite end of the center link 22 is connected to a pitman arm 26 which is connected to the output of the vehicle steering gear (not shown). Actuation of the steering gear causes turning movement of the steerable wheels through the linkage 12 in a known manner.

Figure 2:
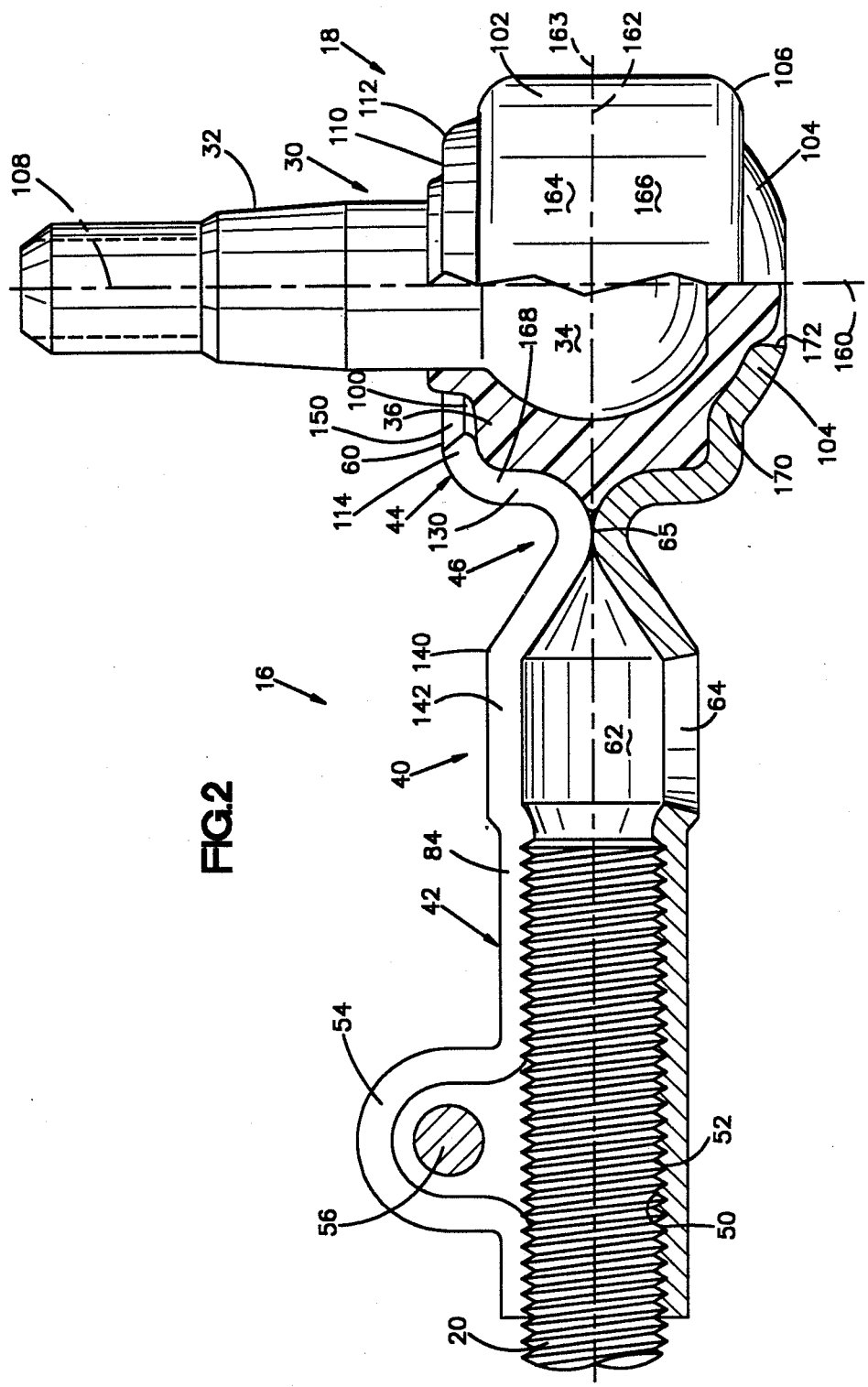
FIG. 2 is an enlarged view, partly in section, illustrating one of the tie rod ends of FIG. 1.

FIGS. 2 and 3 illustrate a tie rod end 16 constructed in accordance with the present invention. The tie rod end 16 includes a ball stud 30 having a shank portion 32 and a head end portion 34. Although head end portion 34 is shown as having a spherical shape, it may also have a hemispherical shape or any other suitable shape. The tie rod end 16 also preferably includes a suitable elastomeric bearing 36 bonded to the ball stud 30. The tie rod end 16 further includes a one-piece stamped sheet metal housing 40. The sheet metal housing 40 includes a longitudinally extending tie rod receiving portion 42; a ball stud receiving or socket portion 44; and a connector portion 46 extending between the tie rod receiving portion 42 and the socket portion 44.

An end portion of the tie rod 20 is threadedly received in the longitudinally extending tie rod receiving portion 42. Tie rod 20 is externally threaded at 50, and the tie rod receiving portion 42 is complementally internally threaded at 52. Rotation of the tie rod 20 relative to the tie rod receiving portion 42 causes an axial displacement therebetween, thereby changing wheel alignment (toe) in a known manner. Clamping ears 54 on the housing 40 cooperate with a bolt 56 and nut 58 to clamp the tie rod 20 and the housing 40 together to prevent relative movement therebetween.

The ball stud 30 is supported for pivotal movement in a chamber 45 defined by the socket portion 44. Socket portion 44 is made of sheet metal which is formed about the ball stud 30 and bearing material 36, causing the bearing 36 to conform to the shape of the chamber 45. The bearing material 36 is thus held in place relative to the socket portion 44 of the housing 40. Because of the resiliency of the elastomeric bearing material 36, ball stud 30 may rotate and pivot to a degree relative to the socket portion 44. The elasticity of the bearing material 36 biases ball stud 30 to its centered position shown in FIG. 2 when moved therefrom.

The socket portion 44 includes an opening 60 through which the shank 32 of the ball stud 30 projects. The sheet metal material of the socket portion 44 may be folded over or deformed at the edge of opening 60 to secure the bearing material 36 in place. The opening 60, as shown in FIG. 3, has an oval shape, and thus the ball stud 30 is constrained to move in a plane parallel to the longitudinal axis of the tie rod receiving portion 42. Opening 60 may be of a different shape to allow for other degrees of movement of the ball stud 30 relative to the bearing 40. The opening 60 is small enough so that the ball stud 30 and bearing 36 are held within the socket portion 44.

The connector section 46 of the housing 40 interconnects the tie rod receiving portion 42 with the socket portion 44. Connector portion 46 (FIG. 2) includes a chip cavity 62 and a chip window 64. Any extraneous metal chips formed during the formation of the housing 40 including the formation of the threads 50 on tie rod receiving portion 42, may come out of the housing 40 through the chip window 64.

In accordance with the present invention, the housing 40, which includes the tie rod receiving portion 42, the ball stud receiving socket portion 44, and the connector portion 46, is a one piece stamped sheet metal element The housing 40 has only one seam. As used herein, the term seam refers to a line of junction between two edges of material, and does not refer to a fold or crimp or overlapping of the material. The seam in the element 40 may have the two edges of material interconnected as by welding or otherwise, but the edges need not be so interconnected, and may simply abut or be located near each other.

The seam 70 (FIG. 3) in element 40 is a single continuous seam which includes a seam portion 70a in the tie rod receiving portion 42; a seam portion 70d in the connector section; a side wall seam portion 70c; and an end wall seam portion 70b. The seam portions 70a, 70b, 70c, and 70d together form one continuous seam 70 extending throughout the length of the tie rod receiving portion 42 and the connector section 46, and through a part of the socket portion 44. The single seam 70 extends only to the opening 60 in the socket portion 44.

The tie rod receiving portion 42 of the housing 40 includes rod wall means 80 (FIG. 3) engaging an end portion of the tie rod 20. The rod wall means 80 has a first minor side surface 84 which forms a first edge of the seam portion 70a disposed in the tie rod receiving portion 42. The rod wall means 80 also includes a second minor side surface 87 which forms a second edge of the seam portion 70a disposed in the tie rod receiving portion 42 The first and second minor side surfaces 84, 87, are disposed adjacent each other throughout the length of the tie rod receiving portion 42. The rod wall means 80 (FIG. 3) has a generally cylindrical portion 89 which extends between the first and second minor side surfaces 84, 87 to define the generally cylindrical chamber 43 which receives the end portion of the tie rod 20. The only seam on the tie rod receiving portion 42 is the seam portion 70a. The generally cylindrical portion 89 of the rod wall means 80 is free of seams.

The socket portion 44 of the housing 40 includes a side wall 102 (FIG. 2) encircling the head end portion 34 of the ball stud 30 and the elastomeric bearing 36. The socket portion 44 also includes a first end wall 104 and a second end wall 110 opposed thereto. The first end wall 104 extends inwardly from a first end portion 106 of the side wall 102 toward a central axis 108 of the stud mounting chamber. The first end wall 104 of the socket portion 44 is free of seams The second end wall 110 extends inwardly from a second end portion 112 of the side wall 102 toward the central axis 108 of the socket portion 44. The second end wall 110 defines the opening 60 in the socket portion 44 through which the central axis 108 of the stud mounting chamber extends.

The second end wall 110 includes a first minor side surface 114 (FIG. 3) and a second minor side surface 116 The first minor side surface 114 forms a first edge of the seam portion 70b disposed in the second end wall 110 of the socket portion 44. The second minor side surface 116 forms a second edge of the seam portion 70b disposed in the second end wall 110 of the socket portion 44. The seam portion 70b of the seam 70 terminates at an edge 122 of the opening 60 in the second end wall 110 of the socket portion 44.

The side wall 102 of the socket portion 44 has a first minor side surface 130 (FIG. 3) which is a continuation of the first minor side surface 114 of the second end wall 110. The side wall 102 also includes a second minor side surface 132 which is a continuation of the second minor side surface 116 of the second end wall 110. The first minor side surface 130 forms a first edge of the seam portion 70c disposed in the side wall 102 of the socket portion 44. The second minor side surface 132 forms a second edge of the seam portion 70c disposed in the side wall 102 of the socket portion 44. The side wall 102 of the socket portion 44, which encircles the ball stud 30 and bearing material 36, is free of seams other than the seam portion 70c.

The connector section 46, which connects the tie rod receiving portion 42 with the socket portion 44, includes a connector wall 140 (FIG. 3) which is a continuation of the rod wall means 80 and of the side wall 102. The connector wall 140 includes a first minor side surface 142 which is a continuation of the first minor side surface 84 of the rod wall means 42, and of the first minor side surface 130 of the side wall 102. The connector wall 140 also includes a second minor side surface 144 which is a continuation of the second minor side surface 87 of the rod wall means 80, and of the second minor side surface 132 of the side wall 102.

The first minor side surface 142 of the connector wall 140 forms a first edge of the seam portion 70d disposed in the connector section 46. The second minor side surface 144 of the connector wall 140 forms a second edge of the seam portion 70d disposed in the connector section 46. Seam portion 70d is the only seam in the connector section 46. Connector wall 140 is free of seams other than the seam portion 70d.

The seam 70 (FIG. 3) on sheet metal element 40, which includes seam portions 70A, 70B, 70C and 70D, is preferably closed along its extent through the connector portion 46 and the socket portion 44. Thus, first minor side surface 114 abuts second minor side surface 116 on second end wall 110. First minor side surface 130 abuts second minor side surface 132 on side wall 102. Similarly, first minor side surface 142 abuts second minor side surface 144 on connector wall 140. The seam portion 70A in rod mounting section 42 is open.

The one piece sheet metal element 40 has one edge surface thereon which extends from along the tie rod receiving section 42, along the connector portion 46, around the opening 60, back along the connector portion 46, and then back along the tie rod mounting section 42. The one continuous edge surface includes first minor side surfaces 84, 142, 130, and 114; edge 150 around opening 60; and second minor side surfaces 116, 132, 144, and 87.

The socket portion 44 of element 40 may also include a second opening 172 (FIG. 2) for air relief upon formation of the portion 44 about the ball stud/bearing combination 34, 36, and also to further secure the elastomeric bearing material 36 within the stud mounting chamber 100. Opening 172 is not located on the seam 70.

The side wall 102 and the first and second end walls 104 and 110, respectively, together form a socket which defines a chamber 45 having the ball stud 30 and the elastomeric bearing 36 mounted therein. The side wall 103 forms a first surface of the socket which encircles the head end portion 34 of the ball stud 30 and engages the bearing 36. The second end wall 110 and the first end wall 104, respectively, form second and third surfaces of the socket which engage opposite ends of the bearing 36 and hold it in the chamber. The one-piece sheet metal housing 40, from which are formed the side wall 102 and the first and second end walls 104, 110, thus has the first, second and third surfaces. As noted above, the one-piece sheet metal housing 40 also includes the tie rod receiving portion 42 and the connector portion 46.

The socket portion 44 may be considered as being divided into four sections by first and second intersecting imaginary planes. The first plane 160 (FIG. 2) extends perpendicular to the axis 163 of the tie rod receiving chamber. The second plane 162 extends perpendicular to the first plane 160 and parallel to the axis 163 of the tie rod receiving chamber. The first and second intersecting planes 160 and 162 thereby divide the socket portion 44 into an upper outer section 164, a lower outer section 166, an upper inner section 168, and a lower inner section 170. (The terms upper, lower, inner, and outer are used herein for reference only with respect to the drawings, and are not intended in any to limit the scope of the invention disclosed herein.) The seam portions 70b and 70c, which together constitute that part of the single seam 70 which is disposed on the socket portion 44, are located in only one of the four sections, to wit, upper inner section 168 of the socket portion 44. The other three sections 164, 166, 170 are each free of seams. The particular section of the socket portion 44 in which the seam portion 70b, 70c is disposed is a section adjacent to or facing the tie rod 20, as opposed to one of the sections which are facing away from the tie rod.

The sheet metal housing 40 may be made using progressive dies. A flat sheet metal blank of an appropriate shape is formed in a succession of different dies until it reaches a partially formed shape where it is ready to have the ball stud/bearing combination inserted therein. The bearing material 36 is in its free state larger than the size of the chamber 45 into which it is received. Thus, upon insertion of the ball stud/bearing into the partially formed housing 40, and formation of the socket portion 44 about the ball stud/bearing, the material of bearing 36 is deformed to its final shape in which it is compressed and held securely in socket portion 44 of housing 40. Housing 40 is preferably crimped together at 65 to close socket portion 40.

FIGS. 4 and 5 illustrate a tie rod end 16' which is an alternative embodiment of the present invention. The embodiment shown in FIGS. 4 and 5 differs from the embodiment shown in FIGS. 2 and 3, in the location of the housing seam. Otherwise, the two embodiments are similar. In the embodiment shown in FIGS. 4 and 5, the first opening 60', through which the shank portion 32' of ball stud 30' extends, is not located along the seam 70', whereas the second opening 172' is located at the termination of seam 70'.

The embodiment shown in FIGS. 4 and 5 has a stronger opening 60', since the edge 150' of the opening 60' is continuous and not interrupted by any seam, the metal being continuous around opening 60'. In this embodiment, the opening 60' is formed, as by cutting into the material, prior to assembly of the ball stud 30' into the stud mounting section 44'. After the ball stud/bearing assembly is inserted into the stud mounting section 44, the material around opening 172' is folded over, for example, by flanging as in a stamping die In the embodiment shown in FIGS. 4 and 5, the housing 40' which receives the end portion of the tie rod and the ball stud 30' is, like the FIG. 1 embodiment, a one-piece stamped sheet metal element.

FIG. 6 illustrates a tie rod end which is another embodiment of the present invention. The tie rod end illustrated in FIG. 6 is generally similar to the tie rod end illustrated in FIGS. 1–5, with the exception that the socket portion of the tie rod end of FIG. 6 has a spherical shape. The socket portion 244 of the tie rod end 216 shown in FIG. 6 includes a first surface or side wall 202; a second surface or second end wall 210; and a third surface or first end wall 204. The first surface 102 encircles the head end portion 234 of the ball stud 230 and engages the elastomeric bearing 236. The second surface 210, and the third surface 204, engage opposite ends of the elastomeric bearing 36 and hold it in the chamber defined by socket 244.

Second end wall 110 (FIG. 6) defines an opening 260 through which the shank portion 232 cf ball stud 230 projects. The tie rod 216 may also include a second opening 272. The one-piece sheet metal element which forms the tie rod end 216 and which includes the socket portion 244, has one seam only. The seam (not shown) may extend to either the opening 260 through which the ball stud 230 projects as in the embodiment of FIG. 3, or it may extend to the second opening 272 as in the embodiment of FIG. 4.

FIGS. 7 and 8 illustrate still another embodiment of the present invention. In this embodiment a different clamp mechanism is used than is used in the embodiments of FIGS. 1–6. In FIG. 7, the tie rod 20' is externally threaded at two spaced apart areas 52', 52''. The threaded sections 52', 52'' cooperate with a complementally internally threaded surface 50' on sheet metal housing 40' to provide for threaded engagement between tie rod 20' and sheet metal member 40'. An annular groove 21' is circumscribed about tie rod 20' between threaded sections 52', 52". Clamping bolt 56', which extends through clamping ears 54' on housing 40', is disposed within the groove 21' and thus is partially within the outer diameter 57' of tie rod 20'.

Bolt 56' cooperates with nut 59' to clamp housing 40' about tie rod 20'. Thus, when housing 40' is clamped about tie rod 20', should the clamp mechanism fail, axial movement of tie rod 20' will be limited by either of a pair of shoulders 61' on tie rod 20' which would abut bolt 56'. Thus, tie rod 20' cannot come completely out of housing 40' unless bolt 56' is removed The axial distance between the pair of shoulders 61' is designed to be sufficient to allow for proper setting of vehicle wheel alignment.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, I claim:

1. A tie rod end comprising:
    a socket defining a chamber and having an opening therein;
    a ball stud having a head end portion located in the socket and a shank portion projecting through the opening and having an axis;
    a preloaded elastomeric bearing interposed between said socket and said head end portion;
    said chamber being at least in part defined by a first surface of said socket which encircles said head end portion and engages said elastomeric bearing and by second and third surfaces which engage opposite ends of said elastomeric bearing and hold said elastomeric bearing in said chamber;
    a longitudinally extending tie rod receiving portion defining a chamber for receiving a tie rod therein;
    means for securing the tie rod in the chamber defined by said tie rod receiving portion;
    a connecting portion interconnecting said socket portion and said tie rod receiving portion and including surfaces extending transverse to the axis of said shank portion and which abut each other to close said chamber adjacent said connecting portion;
    said socket, said tie rod receiving portion and said connecting portion comprising one piece of sheet metal having said first, second and third surfaces.

2. A tie rod end as set forth in claim 1 wherein said one piece of sheet metal comprises a sheet metal stamping formed from a single flat piece of sheet material.

3. A tie rod end as set forth in claim 1 wherein said second surface of said socket includes surface means defining the opening in said socket.

4. A tie rod end as set forth in claim 3 wherein said surface means defining the opening in said socket limits pivotal movement of said ball stud to pivotal movement in a plane parallel to the longitudinal axis of said tie rod receiving portion.

5. A tie rod as set forth in claim 1 wherein said one piece of sheet metal has one continuous seam extending throughout said tie rod receiving portion and said connecting portion and partially along one of said second and third surfaces of said socket portion, each of said tie rod receiving portion and said connecting portion and said socket portion being free of seams other than said one seam.

6. A tie rod end as set forth in claim 5 wherein said seam extends partially along said second surface of said socket portion and said seam does not extend along said third surface and wherein said second surface includes surface means defining the opening in said socket.

7. A tie rod end comprising:
    a socket defining a chamber and having an opening therein;
    a ball stud having a head end portion located in the socket and a shank portion projecting through the opening;
    a bearing interposed between said socket and said head end portion;
    said chamber being at least in part defined by a first surface of said socket which encircles said head end portion and engages said bearing and by second and third surfaces which engage opposite ends of said bearing and hold said bearing in said chamber;
    a longitudinally extending tie rod receiving portion defining a chamber for receiving a tie rod therein;
    means for securing the tie rod in the chamber defined by said tie rod receiving portion;
    a connecting portion interconnecting said socket portion and said tie rod receiving portion;
    said socket, said tie rod receiving portion and said connecting portion comprising one piece of sheet metal having said first, second and third surfaces;
    said one piece of sheet metal having one continuous seam extending throughout said tie rod receiving portion and said connecting portion and partially along one of said second and third surfaces of said socket portion, each of said tie rod receiving portion and said connecting portion and said socket portion being free of seams other than said one seam;
    wherein said seam extends partially along said second surface of said socket portion and does not extend along said third surface, and wherein said third surface includes means defining the opening in said socket.

8. A tie rod end comprising:
    a socket defining a chamber and having an opening therein;
    a ball stud having a head end portion located in the socket and a shank portion projecting through the opening;
    a bearing interposed between said socket and said head end portion;
    said chamber being at least in part defined by a first surface of said socket which encircles said head end portion and engages said bearing and by second and third surfaces which engage opposite ends of said bearing and hold said bearing in said chamber;
    a longitudinally extending tie rod receiving portion defining a chamber for receiving a tie rod therein;
    means for securing the tie rod in the chamber defined by said tie rod receiving portion;
    a connecting portion interconnecting said socket portion and said tie rod receiving portion;
    said socket, said tie rod receiving portion and said connecting portion comprising one piece of sheet metal having said first, second and third surfaces;
    said tie rod end being for use with a tie rod which has first and second threaded portions which are axially separated from each other by an annular peripheral groove extending between respective facing shoulder surfaces, wherein said means for securing the tie rod in the chamber includes a pair of apertured clamping ears on said tie rod receiving portion, a bolt at least partially located in said groove and extending through the apertures on said clamping ears, and a nut cooperating with said bolt to clamp together said clamping ears.

9. A tie rod end comprising:
a one-piece sheet metal housing for connecting a tie rod and a ball stud;
a ball stud having a head end portion and a shank portion having an axis, said head end portion being disposed within a socket portion of said housing; and
a preloaded elastomeric bearing interposed between said socket portion and said head end portion;
said one-piece sheet metal housing further including rod wall means
 (i) defining a longitudinally extending chamber for receiving an end portion of the tie rod therein and
 (ii) forming a rod wall having only one seam, said rod wall wrapping around the tie rod to thereby connect the tie rod to said one-piece housing, said rod wall seam being disposed on one side only of the tie rod and extending generally parallel to a longitudinal axis of the chamber;
said socket portion wrapping around said elastomeric bearing and said head end portion of said ball stud to enclose said stud in said housing;
said one-piece sheet metal housing including surfaces extending transverse to the axis of said shank portion and which abut each other to close said socket portion adjacent said longitudinally extending chamber;
said socket portion having only one seam, said one seam in said socket portion forming a continuation of said rod wall seam;
said one-piece housing having an edge surface extending along the tie rod receiving portion, along said socket portion to thereby define an opening in said socket portion, and back along the tie rod receiving portion.

10. A tie rod end as set forth in claim 9 wherein said socket portion has four sections defined by first and second imaginary intersecting planes, said first plane extending perpendicular to the axis of the tie rod receiving chamber, said second plane extending perpendicular to said first plane and parallel to the axis of the tie rod receiving chamber, said intersecting planes thereby dividing said socket portion into an upper outer section, a lower outer section, an upper inner section, and a lower inner section, said socket portion seam being located in only one of said four sections.

11. A tie rod end as set forth in claim 10 wherein said one section having said socket portion seam is said upper inner section and is a section of said socket portion adjacent to the tie rod, the sections of said socket portion opposite from the tie rod being free of seams, each of said upper outer section and said lower outer section and said lower inner section of said socket portion being free of seams.

12. A tie rod end as set forth in claim 9 wherein said shank portion of said ball stud extends through the opening in said socket portion.

13. A tie rod end as set forth in claim 10 wherein said socket portion seam is located in said upper inner section of said upper outer socket portion, and wherein said edge surface extends through said upper inner section and said upper outer section and does not extend through said lower inner section and said lower outer section, and wherein said shank portion of said ball stud extends through the opening.

14. A tie rod end comprising:
a one-piece sheet metal housing for connecting a tie rod and a ball stud;
a ball stud having a head end portion and a shank portion, said head end portion being disposed within a socket portion of said housing; and
a bearing interposed between said socket portion and said head end portion;
said one-piece sheet metal housing further including rod wall means
 (i) defining a longitudinally extending chamber for receiving an end portion of the tie rod therein and
 (ii) forming a rod wall having only one seam, said rod wall wrapping around the tie rod to thereby connect the tie rod to said one-piece housing, said rod wall seam being disposed on one side only of the tie rod and extending generally parallel to a longitudinal axis of the chamber;
said socket portion wrapping around said bearing and said head end portion of said ball stud to enclose said stud in said housing;
said socket portion having only one seam, said one seam in said socket portion forming a continuation of said rod wall seam;
said one-piece housing having an edge surface extending along the tie rod receiving portion, along said socket portion to thereby define an opening in said socket portion, and back along the tie rod receiving portion;
said socket portion having four sections defined by first and second imaginary intersecting planes, said first plane extending perpendicular to the axis of the tie rod receiving chamber, said second plane extending perpendicular to said first plane and parallel to the axis of the tie rod receiving chamber, said intersecting planes thereby dividing said socket portion into an upper outer section, a lower outer section, an upper inner section, and a lower inner section, said socket portion seam being located in only one of said sour sections;
wherein said socket portion seam is located in said upper inner section of said socket portion, and wherein said edge surface extends through said upper inner section and said upper outer section and does not extend through said lower inner section and said lower outer section, and further including means in said lower inner and lower outer section defining a second opening in said socket portion, said shank portion of said ball stud extending through said second opening.

15. A tie rod end comprising:
a one-piece sheet metal housing for connecting a tie rod and a ball stud;
a ball stud having a head end portion and a shank portion, said head end portion being disposed within a socket portion of said housing; and
a bearing interposed between said socket portion and said head end portion;

said one-piece sheet metal housing further including rod wall means
  (i) defining a longitudinally extending chamber for receiving an end portion of the tie rod therein and
  (ii) forming a rod wall having only one seam, said rod wall wrapping around the tie rod to thereby connect the tie rod to said one-piece housing, said rod wall seam being disposed on one side only of the tie rod and extending generally parallel to a longitudinal axis of the chamber;
said socket portion wrapping around said bearing and said head end portion of said ball stud to enclose said stud in said housing;
said socket portion having only one seam, said one seam in said socket portion forming a continuation of said rod wall seam;
said one-piece housing having an edge surface extending along the tie rod receiving portion, along said socket portion to thereby define an opening in said socket portion, and back along the tie rod receiving portion;
said tie rod end being for use with a tie rod which has first and second threaded portions which are axially separated from each other by an annular peripheral groove extending between respective facing shoulder, and further comprising a pair of apertured clamping ears on said rod wall, a bolt at least partially located in said groove and extending through the apertures in said clamping ears, and a nut cooperating with said bolt to clamp together said clamping ears.

16. An apparatus for connecting a ball stud with a tie rod, said apparatus comprising:
an elongated rod mounting section;
a socket portion having surface means defining an opening therein;
a connector section extending between said rod mounting section and said socket portion, said rod mounting section, socket portion and connector section being formed from only a single piece of material; and
a single seam extending throughout the length of said rod mounting section, the length of said connector section, and through only a portion of said ball mounting section to the opening;
said rod mounting section including rod wall means for engaging one end portion of a tie rod, said rod wall means having a first minor side surface which forms a first edge of the portion of said single seam disposed in said rod mounting section and a second minor side surface which forms a second edge of the portion of said single seam disposed in said rod mounting section, said first and second minor side surfaces being disposed adjacent to each other throughout the length of said rod mounting section;
said rod wall means having a generally cylindrical portion which extends between said first and second minor side surfaces to define a generally cylindrical chamber for receiving the one end portion of the tie rod, said generally cylindrical portion of said rod wall means being free of seams;
a preloaded elastomeric bearing in said stud mounting chamber for surrounding the head end portion of the ball stud;
said socket portion including second wall means defining a stud mounting chamber for receiving the head end portion of the ball stud, said second wall means including a side wall which extends around at least a major portion of the stud mounting chamber, a first end wall which extends inwardly from a first end portion of the side wall toward a central axis of the stud mounting chamber, and a second end wall which extends inwardly from a second end portion of the side wall toward the central axis of the stud mounting chamber, said second end wall defining the opening in said socket portion, the central axis of the stud mounting chamber extending through the opening;
said connector section including surfaces extending transverse to the axis of said stud mounting chamber and which abut each other to close said stud mounting chamber adjacent said connector section;
said second end wall having a first minor side surface and a second minor side surface, said first minor side surface of said second end wall of said socket portion forming a first edge of the portion of said single seam disposed in said second end wall of said socket portion, said second minor side surface of said second end wall of said socket portion forming a second edge of the portion of said single seam disposed in said second end wall of said socket portion, said single sam terminating at an edge of the opening in said second end wall of said socket portion, said first end wall of said socket portion being free of seams;
said side wall of said socket portion having a first minor side surface which is a continuation of the first minor side surface of said second end wall, said side wall of said socket portion having a second minor side surface which is a continuation of the second minor side surface of said second end wall, said first minor side surface of said side wall of said socket portion forming a first edge of the portion of said single seam disposed in said side wall of said socket portion, said second minor side surface of said side wall of said socket portion forming a second edge of the portion of said single seam disposed in said side wall of said socket portion, said side wall of said socket portion being free of seams other than a portion of said single seam;
said connector section being formed as one piece with said rod mounting section and said socket portion, said connector section having a connector wall which is a continuation of said rod wall means and of said side wall of said socket portion, said connector wall having a first minor side surface which is a continuation of the first minor side surface of said rod wall means and the first minor side surface of said side wall of said socket portion, said connector wall having a second minor side surface which is a continuation of the second minor side surface of said rod wall means and the second minor side surface of said side wall of said socket portion, said first minor side surface of said connector wall forming a first edge of the portion of said single seam disposed in said connector section, said second minor side surface of said connector wall forming a second edge of the portion of said single seam disposed in said connector section, said connector wall being free of seams other than a portion of said single seam.

17. An apparatus as set forth in claim 16 wherein the opening in said second end wall defines a first area of the second end wall facing toward said connector section and a second area of the second end wall facing away from said connector section, said portion of said single seam being disposed in said first area of said second end wall, said second area of said second end wall being free of seams.

18. An apparatus as set forth in claim 16 wherein said first end wall has surface means defining an opening therein.

19. An apparatus as set forth in claim 18 wherein one of said first end wall surface means and said second end wall surface means comprises means for circumscribing a shank of the ball stud.

20. An apparatus as set forth in claim 19 wherein said first end wall surface means comprises said means for circumscribing the shank of the ball stud.

21. An apparatus as set forth in claim 19 wherein said second end wall surface means comprises said means for circumscribing the shank of the ball stud.

22. An apparatus for connecting a ball stud with a tie rod, said apparatus comprising:
   an elongated rod mounting section;
   a socket portion having surface means defining an opening therein;
   a connector section extending between said rod mounting section and said socket portion, said rod mounting section, socket portion and connector section being formed from only a single piece of material; and
   a single seam extending throughout the length of said rod mounting section, the length of said connector section, and through only a portion of said ball mounting section to the opening;
   said rod mounting section including rod wall means for engaging one end portion of a tie rod, said rod wall means having a first minor side surface which forms a first edge of the portion of said single seam disposed in said rod mounting section and a second minor side surface which forms a second edge of the portion of said single seam disposed in said rod mounting section, said first and second minor side surfaces being disposed adjacent to each other throughout the length of said rod mounting section;
   said rod wall means having a generally cylindrical portion which extends between said first and second minor side surfaces to define a generally cylindrical chamber for receiving the one end portion of the tie rod, said generally cylindrical portion of said rod wall means being free of seams;
   said socket portion including second wall means defining a stud mounting chamber for receiving the head end portion of the ball stud, said second wall means including a side wall which extends around at least a major portion of the stud mounting chamber, a first end wall which extends inwardly from a first end portion of the side wall toward a central axis of the stud mounting chamber, and a second end wall which extends inwardly from a second end portion of the side wall toward the central axis of the stud mounting chamber, said second end wall defining the opening in said socket portion, the central axis of the stud mounting chamber extending through the opening;
   said second end wall having a first minor side surface and a second minor side surface, said first minor side surface of said second end wall of said socket portion forming a first edge of the portion of said single seam disposed in said second end wall of said socket portion, said second minor side surface of said second end wall of said socket portion forming a second edge of the portion of said single seam disposed in said second end wall of said socket portion, said single seam terminating at an edge of the opening in said second end wall of said socket portion, said first end wall of said socket portion being free of seams;
   said side wall of said socket portion having a first minor side surface which is a continuation of the first minor side surface of said second end wall, said side wall of said socket portion having a second minor side surface which is a continuation of the second minor side surface of said second end wall, said first minor side surface of said side wall of said socket portion forming a first edge of the portion of said single seam disposed in said side wall of said socket portion, said second minor side surface of said side wall of said socket portion forming a second edge of the portion of said single seam disposed in said side wall of said socket portion, said side wall of said socket portion being free of seams other than a portion of said single seam;
   said connector section being formed as one piece with said rod mounting section and said socket portion, said connector section having a connector wall which is a continuation of said rod wall means and of said side wall of said socket portion, said connector wall having a first minor side surface which is a continuation of the first minor side surface of said rod wall means and the first minor side surface of said side wall of said socket portion, said connector wall having a second minor side surface which is a continuation of the second minor side surface of said rod wall means and the second minor side surface of said side wall of said socket portion, said first minor side surface of said connector wall forming a first edge of the portion of said single seam disposed in said connector section, said second minor side surface of said connector wall forming a second edge of the portion of said single seam disposed in said connector section, said connector wall being free of seams other than a portion of said single seam;
   wherein the tie rod has first and second threaded portions which are axially separated from each other by an annular peripheral groove extending between respective facing shoulder surfaces at the junctions between said groove and said first and second threaded portions, and further comprising a pair of apertured clamping ears on said rod wall means, a bolt extending through the apertures in said clamping ears, and a nut cooperating with said bolt to clamp together said clamping ears, said bolt engaging the groove in the tie rod.

23. A tie rod end comprising:
   a socket defining a chamber and having an opening therein;
   a ball stud having a head end portion located in the socket and a shank portion projecting through the opening and having an axis;
   a preloaded elastomeric bearing interposed between said socket and said head end portion;
   said chamber being at least in part defined by a first surface of said socket which encircles said head end portion and engages said elastomeric bearing and by second and third surfaces which engage opposite ends of said elastomeric bearing and hold said elastomeric bearing in said chamber;

a longitudinally extending tie rod receiving portion defining a chamber for receiving a tie rod therein;

means for securing the tie rod in the chamber defined by said tie rod receiving portion;

a connecting portion interconnecting said socket portion and said tie rod receiving portion;

said socket, said tie rod receiving portion and said connecting portion comprising one piece of sheet metal having said first, second and third surfaces, and said one piece of sheet metal including portions which abut to close said chamber adjacent said connector portion.

* * * * *

UNITED STATES PATENT AND TRADEMARK OFFICE
CERTIFICATE OF CORRECTION

PATENT NO. : 4,890,949

DATED : January 2, 1990

INVENTOR(S) : Ruey E. Wood, Jr.

It is certified that error appears in the above-identified patent and that said Letters Patent is hereby corrected as shown below:

Column 10, Line 50, Claim 14, change "sour" to --four--.

Column 12, Line 26, Claim 16, change "sam" to --seam--.

Signed and Sealed this

Twenty-fifth Day of December, 1990

Attest:

HARRY F. MANBECK, JR.

*Attesting Officer*  *Commissioner of Patents and Trademarks*